United States Patent [19]

Miyata

[11] 4,021,823
[45] May 3, 1977

[54] PHOTOMETRIC DEVICE BUILT INTO VIEWFINDER SYSTEM FOR A SINGLE LENS REFLEX CAMERA

[75] Inventor: Katsuhiko Miyata, Saitama, Japan

[73] Assignee: Asahi Kogaku Kogyo Kabushiki Kaisha, Tokyo, Japan

[22] Filed: Sept. 11, 1975

[21] Appl. No.: 612,277

[30] Foreign Application Priority Data

Sept. 30, 1974 Japan .................... 49-118010[U]

[52] U.S. Cl. ................... 354/31; 354/56; 354/155; 354/225
[51] Int. Cl.² ...................................... G03B 7/08
[58] Field of Search ................ 354/23, 31, 56, 53, 354/54, 55, 152, 155, 219, 224, 225

[56] References Cited

UNITED STATES PATENTS

| | | | |
|---|---|---|---|
| 3,513,759 | 5/1970 | Kondo | 354/56 |
| 3,563,149 | 2/1971 | Suzuki | 354/56 |
| 3,631,784 | 1/1972 | Jurenz | 354/56 |
| 3,710,699 | 1/1973 | Mitani | 354/152 X |
| 3,788,202 | 1/1974 | Wiessner | 354/152 |
| 3,864,699 | 2/1975 | Tsunekawa et al. | 354/56 |
| 3,864,702 | 2/1975 | Sugiyama et al. | 354/56 |

FOREIGN PATENTS OR APPLICATIONS

| | | | |
|---|---|---|---|
| 208,251 | 1955 | Australia | 354/224 |
| 298,155 | 1954 | Switzerland | 354/152 |
| 259,139 | 1949 | Switzerland | 354/224 |

*Primary Examiner*—John Gonzales
*Attorney, Agent, or Firm*—Christie, Parker & Hale

[57] ABSTRACT

A through the lens (TTL) photometric function is provided by apparatus built into a viewfinder system for a single lens reflex (SLR) camera. As to the viewfinder function, an optical path is defined between the SLR focusing screen and a viewfinder eyepiece. A first prism, forming part of the optical path, has a plurality of faces, two of which serve to internally reflect light entering the prism so that the light emerging from the prism has been twice reflected. As to the photometric function, at least one separate optical path is defined for light emerging from the first prism at a peripheral position outside the finder field. In each separate optical path there is a second prism and a light receiving element with the second prism being arranged between the first prism and the light receiving element.

3 Claims, 6 Drawing Figures

PHOTOMETRIC DEVICE BUILT INTO VIEWFINDER SYSTEM FOR A SINGLE LENS REFLEX CAMERA

BACKGROUND OF THE INVENTION

This invention relates to an arrangement for facilitating the performance of the TTL photometric function in an SLR.

Most modern SLR cameras are designed so that the camera body is adapted to accept various interchangeable components including interchangeable lenses and interchangeable viewfinders. A wide variety of viewfinder systems have been proposed heretofore. Interchangeable viewfinders include waist-level-finders, high magnification finders, and sports finders. An example of an eye level/waist level selectable finder is disclosed and claimed in a commonly assigned application entitled VIEWFINDER SYSTEM FOR A SINGLE LENS REFLEX CAMERA, filed Sept. 11, 1975 by Tetsuji Shono and bearing Serial No. 612,276. Almost all the modern SLR's have a TTL photometric function for this has been found to simplify the exposure determining operation and other operations. Various proposals have been set forth with respect to where one or more light receiving elements should be positioned with respect to the associating TTL photometric optical system. Depending on the positions at which the light receiving elements are disposed, SLR cameras may be classified into two broad types. The first type is such that, taking an eye level finder for instance, one or more light receiving elements are arranged close to the pentaprism so that, when the pentaprism is detached from the camera body for replacing the finder with another one, the light receiving elements are detached together with the pentaprism. The second type is such that one or more light receiving elements are arranged either on the rear side of the mirror or on the surface of the condenser lens at its peripheral positions so that the light receiving elements are not detached from the camera body upon disengagement of the finder. In the SLR cameras of the second type, it is unnecessary to arrange a photometric optical system on the side of the interchangeable finder. Therefore, even when the finders are interchanged, the TTL photometric function remains unchanged and the photometric conditions are unaffected. On the other hand, the SLR cameras that have a TTL photometric system on the side of the interchangeable finder involved problems. Included among these problems is the problem of effecting the circuit connection between the camera body and the attached finder, which has to be carried out after each finder interchanging operation; differences in optical systems between different finders and arrangement of light receiving elements. These difficulties are liable to have an adverse effect upon the photometric function and accuracy thereof. Moreover, when a finder having no photometric function is attached, the practical value of the camera will be much reduced because the camera will no longer be able to exhibit a photometric function, thereby making it difficult to attain an accurate film exposure.

Therefore, in circumstances in which TTL photometry is to be effected by arranging a photometric optical system and one or more light receiving elements in the interchangeable viewfinder for an SLR, it becomes a problem how to minimize the error in the interlocking diaphragm operation, deviation of the light receiving efficiency, non-uniformity in the distribution of the received light, influence of the counter-incident light coming through the eyepiece, and influence of the provision of a photometric optical system and light receiving elements over the easy finder observation. It is important to minimize the error in the interlocking diaphragm operation, not only for the interchangeable lenses for use in a camera in a TTL photometric type but also for the interchangeable viewfinders. That is, photometric error which arises in different interchangeable viewfinder results in an error in the interlocking diaphragm operation, which in turn results in an error in film exposure.

Consider now circumstances in which an exposure value EV3 (the third exposure multiple grade; magnification, X8 or ⅛) is obtained with an eye level finder wherein the difference between the full-open photometric outputs obtained by, for example, a lens of F=1.4 and 50mm focal length and another lens of F=4 and 200mm focal length forms the standard level. If the exposure value is changed to EV2.5 by replacing the finder with another one, then an error of EV0.5 appears which acts as a cause of error in the interlocking diaphragm operation. This error is most influenced by the variation in the relative position and angular position of the light-receiving elements with respect to the imaging plane. It is therefore necessary that, in each interchangeable finder, the light-receiving elements should be arranged at conjugate positions and in an equal angular position with respect to the imaging plane.

The light-receiving efficiency is a photometric conversion efficiency of a light-receiving element and shows how much output the light-receiving element develops upon receiving a light having a preselected brightness. Electrical compensation for the difference between the light-receiving efficiencies of various interchangeable finders involves a complicated photometric circuit. For this reason, interchangeable finders are preferably made in such a manner that they have an identical light-receiving efficiency. The distribution of the received light is determined by the angular position of the light-receiving elements with respect to the imaging plane. Therefore, to eliminate the danger of photometric error the light-receiving elements of the interchangeable finders have to be arranged so that they have an identical angular position to the corresponding imaging plane. The counter-incident light coming through the eyepiece will result in an error in the photometry and therefore should be eliminated. However, to perfectly shut off the counter-incident light, it is necessary to provide, for example, an eyepiece shutter and to close it at each photometric operation. This is very troublesome and inconvenient. In order to minimize the influence of the counter-incident light coming through the eyepiece without using any additional complicated means, the light-receiving elements have to be disposed at precise positions. It is also necessary to eliminate the danger that the easy finder observation is prevented by the provision of the photometric optical system and light-receiving elements.

SUMMARY OF THE INVENTION

This invention is directed to an arrangement for a TTL photometric system in an SLR camera having a focusing screen upon which an image is formed, an eyepiece, and means defining an optical path so that the image can be viewed through the eyepiece. Briefly, the arrangement comprises a first prism, a light-receiving photometric element, and a second prism. The first prism forms part of the optical path and has a roof face and a reflecting face. The first prism is positioned with respect to the focusing screen and with respect to the eyepiece such that a first region of the reflecting face defines a finder field and a second region of the reflecting face outside the finder field has light reflected thereto from the roof face. The second prism is adhered to the second region of the reflecting face for causing a portion of the light reflecting off the roof face to impinge upon the light receiving element, the second prism defining an optical axis which is aligned with a light path of light coming from the center of the focusing screen.

In a preferred embodiment, the photoelectric element and the second prism form one cooperating pair of elements, and there is further provided another identical cooperating pair of elements. Preferably, the optical-path-defining means include a first portion and a second, replaceable portion so that different types of viewfinders can be provided by the camera. The first prism is part of the first portion so that the second prism and the light receiving photometric element are not affected by changeover from one type of viewfinder to another.

DETAILED DESCRIPTION

Figure 1:
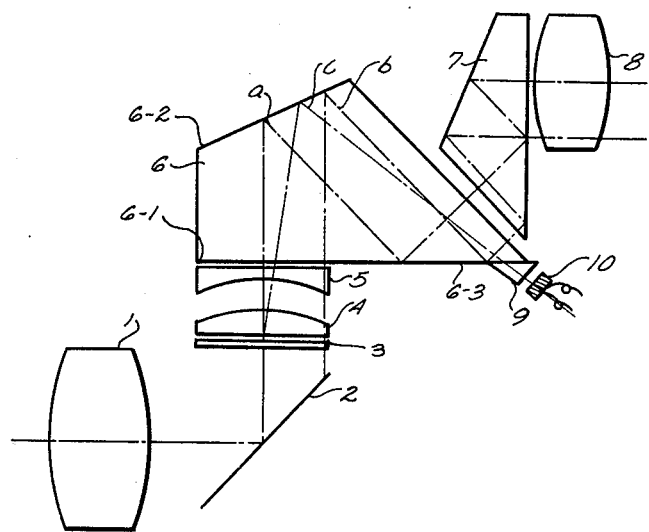
FIG. 1 is a side elevation section illustrating the principles of one embodiment of this invention.

FIG. 1 is a side elevational section illustrating an eye-level/waist-level selectable viewfinder and the photometric device according to one embodiment of this invention. Light passes through a photographing lens (interchangeable lens) 1 then is reflected by a mirror 2 and forms an image on a focusing screen or plate 3. Then the light which has formed an image on the focusing plate 3 passes through a condenser lens 4 and enters the eye-level/waist-level selectable viewfinder which is composed of a first portion and a second, replaceable portion. In the first portion, there are arranged a distortion-correcting concave lens 5 and a first prism 6. The replaceable portion includes a second prism 7 and an eyepiece 8. The first prism 6 is provided with a light-entering face 6-1, a roof face 6-2, and a total reflecting face 6-3. The main light $a$ and the lights $b$ defining the edges of the finder field enter the first prism 6 through the light-entering face 6-1. Then the lights $a$ and $b$ are reflected firstly by the roof face 6-2 and then secondly by the total reflecting face 6-3. The twice-reflected light enters the second prism 7. After having been reflected by the two reflecting faces of the prism 7, these lights $a$ and $b$ pass through the eyepiece 8 and reach the eye of the user.

For purposes of photometry, a pair of small prisms 9 are adhered to the total reflecting face 6-3 at positions outside the region of the reflecting face 6-3 upon which the lights $b$ impinge and define the edges of the finder field. These prisms serve to direct a portion of the light of the imaging surface (focusing surface) onto the corresponding light-receiving elements 10, each of which is so directed that the optical axis thereof is identical with the light path of the light portion coming from the center of the imaging surface. In FIG. 1 such light path is represented by line $c$.

Figure 2:
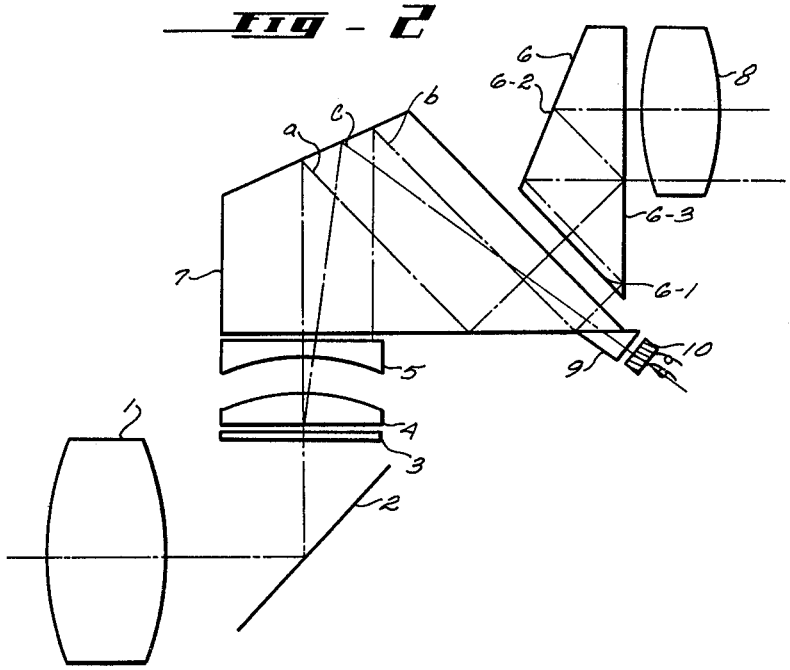
FIG. 2 is a view similar to FIG. 1, illustrating the principles of a modified embodiment of this invention.

FIG. 2 is the side elevational section of a modified eye-level/waist-level selectable finder and photometric device. In this arrangement the prism 7 having two reflecting faces acts as the first prism and the prism 6 having a roof face and a reflecting face acts as the second prism.

Figure 3:
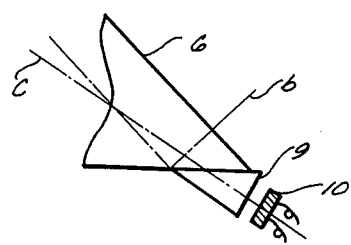
FIG. 3 is an enlarged side elevation section of a portion of the embodiment of FIG. 1.
Figure 4:
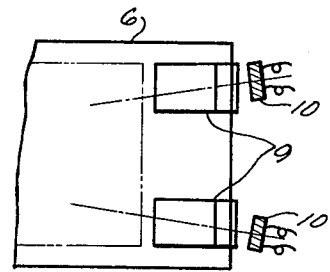
FIG. 4 is a plan view corresponding to FIG. 3.

FIG. 3 is an enlarged side elevational section illustrating the photometric optical system, which can measure the average brightness of the light by directly disposing the light-receiving elements 10 behind the corresponding small prisms 9. Although the shown embodiment is provided with a pair of light-receiving elements 10 and 10 (FIGS. 3 and 4), a photometric operation may also be effected with a single light-receiving element 10 disposed in the center position. In this case, however, care must be had to minimize the error in the interlocking diaphragm operation as well as the deviation of the light-receiving efficiency or, in other words, the light-receiving elements of various interchangeable finders have to be disposed at conjugate positions.

Figure 5:
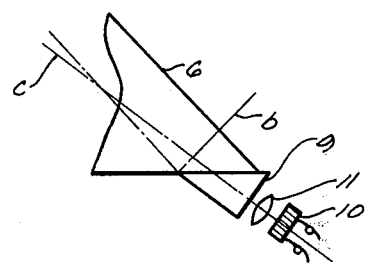
FIG. 5 is a view similar to FIG. 3, with respect to the embodiment of FIG. 2.
Figure 6:
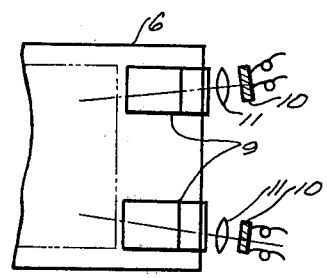
FIG. 6 is a plan view corresponding to FIG. 4.

FIG. 5 illustrates an embodiment wherein condenser lenses 11 and 11 are interposed between the small prisms 9 and corresponding light-receiving elements 10. With this arrangement the light-receiving efficiency increases and the distribution of the received light becomes suitable for the spot photometry.

It will be appreciated from the foregoing description that, by disposing the light-receiving elements not on the movable second prism but in association with the first prism, this invention is effective for eliminating the error in the interlocking diaphragm operation, deviation of the light-receiving efficiency and ununiformity in the distribution of the received light. Another feature of this invention lies in that, by arranging light-receiving elements behind the corresponding small prisms which are adhered on the total reflecting face of the first prism at positions outside of the lights $b$ defining the edges of the finder field, the influence of the counter-light coming through the eyepiece can be eliminated and an easy finder observation can be maintained. Still another feature of this invention lies in that the second prism can be removed without exerting any influence over the photometry. This increases the usage of the camera while maintaining the original photometric function of the viewfinder, because by removing the second prism from the viewfinder of this invention can be used as a semi-waist-level finder and in this position, if desired, an additional high-magnification finder or the like can be attached to the viewfinder of this invention.

What is claimed is:

1. In a single lens reflex camera having a focusing screen upon which an image is formed, an eyepiece, and means defining an optical path so that the image can be viewed through the eyepiece, an arrangement for a through-the-lens photometric system comprising:

a first prism forming part of the optical path, the first prism having a roof face and a reflecting face, the first prism being positioned with respect to the focusing screen and with respect to the eyepiece such that a first, light-entering region of the reflecting face is aligned in parallel with the focusing screen to define a finder field and a second region of the reflecting face outside the finder field has light reflected thereto from the roof face;

a light-receiving photometric element;

a second prism adhered to the second region of the reflecting face for causing a portion of the light reflected from the roof face to impinge upon the light receiving element, the second prism defining an optical axis which is aligned with a light path of light coming from the center of the focusing screen.

2. An arrangement according to claim 1 wherein said photometric element and second prism form one cooperating pair of elements, and further comprising another identical cooperating pair of elements.

3. An arrangement according to claim 1 wherein said means defining an optical path includes a first portion and a second, replaceable portion so that different types of viewfinders can be provided by the camera, the first prism being part of the first portion so that the second prism and the light-receiving photometric element are not affected by changeover from one type of viewfinder to another.

* * * * *